United States Patent Office  3,739,041
Patented June 12, 1973

3,739,041
CURABLE COMPOSITION OF MATTER OF CARBOXYL TERMINATED POLYESTERS AND DIEPOXY COMPOUNDS
Rolf Schmid, Gelterkinden, and Willy Fisch, Basel, Switzerland, assignors to Ciba-Geigy AG, Basel, Switzerland
No Drawing. Continuation-in-part of application Ser. No. 699,384, Jan. 22, 1968. This application Mar. 8, 1971, Ser. No. 122,198
Claims priority, application Switzerland, Jan. 25, 1967, 1,072/67; Mar. 8, 1967, 3,391/67
Int. Cl. C08g 45/14
U.S. Cl. 260—835          10 Claims

ABSTRACT OF THE DISCLOSURE

The invention relates to process for the manufacture of crystalline, predominantly linear polyadducts, characterized in that a long-chain dicarboxylic acid of the formula

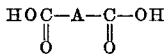

in which A represents a predominantly linear residue in which polymethylene chains alternate in a regular manner with ether oxygen atoms or carboxylic acid ester groups, the quotient $Z:Q$ (in which Z represents the number of carbon atoms in the recurrent structural unit of residue A and Q the number of oxygen bridges in the recurrent structural unit of residue A) being at least 5 and preferably at least 6, and the total number of carbon atoms in alternating carbon chains in residue A) being at least 50, is reacted at an elevated temperature with diepoxy compounds to form polyadducts, using for every equivalent of epoxide groups 0.7 to 1.2, preferably 0.9 to 1.0 equivalent of carboxyl groups.

This application is a continuation-in-part application of our copending application Ser. No. 699,384 filed Jan. 22, 1968, and now abandoned.

It is known that by the polyaddition of polyhydric aliphatic carboxylic acids onto polyepoxides, for example polyglycidyl ethers of biphenol A, crosslinked polymer products of high flexibility can be obtained, with the flexibility of the products increasing the more, the higher the share of aliphatic chains becomes. However, the products become progressively softer and finally possess only mechanical strength properties.

It has now been found that the polyaddition of certain long-chain discarboxylic acids, whose chain contains alternating carboxylic acid ester groups or ether oxygen bridges, on to diepoxides gives rise to novel polymers combining unexpected and for many industrial purposes advantageous mechanical and physical properties. The new polymers are crystalline and tough at room temperature and combine a high elongation at rupture with a surprisingly high tensile strength. At elevated temperatures, on the other hand, they have the elasticity of rubber. To achieve this singular combination of properties, which has so far not been paralleled not only in the field of epoxy resins but in the whole field of synthetic polymers, the long-chain dicarboxylic acids used for the polyaddition must satisfy very definite structural requirements: They must be built up from polymethylene chains that alternate with carboxylic acid ester groups or ether oxygen atoms in a regular manner. Furthermore, the quotient $Z:Q$—where Z represents the number of carbon atoms present in the structural unit that is to say in the smallest recurrent chemical grouping in the chain, and Q represents the number of oxygen bridges in the structural unit—must be at least 5 and preferably at least 6, for which purpose not only the carbon atoms of the polymethylene chain of the basic structural units but also the carbon atoms in the carboxylic acid ester groups being counted as carbon atoms of the structural units. Moreover, in the chain of the dicarboxylic acid concerned the total sum of carbon atoms present in the alternating carbon chains of the basic building blocks must be at least 50. The stoichiometric proportions of the reactants must furthermore be chosen so that for every equivalent of epoxide groups of the diglycidyl compound 0.8 to 1.1 equivalents of carboxyl groups of the dicarboxylic acid are used.

Accordingly, the present invention provides a process for the manufacture of crystalline polyadducts, characterized in that long-chain dicarboxylic acids of the formula (I) 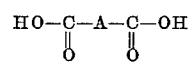

in which A represents a substantially linear residue in which polymethylene chains alternate in a regular fashion with ether-oxygen atoms or carboxylic acid ester groups, the quotient $Z:Q$, in which Z represents the number of carbon atoms in the recurrent structural units of residue A, and Q represents the number of oxygen bridges present in the recurrent structural units of residue A, being at least 6, the total number of carbon atoms in alternating carbon chains in residue A being at least 50—are reacted at an elevated temperature with diepoxy compounds to form polyadducts, the diepoxy compound used having preferably an epoxide equivalent weight not greater than 500, using for every equivalent of epoxide groups 0.7 to 1.2, preferably 0.9 to 1.0 equivalent of carboxyl groups.

As diepoxy compounds there are preferably used diglycidyl ethers or esters of the formula (II) 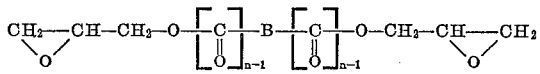

in which B represents a bivalent aliphatic, cycloaliphatic, araliphatic or aromatic residue and $n=1$ or 2.

The dicarboxylic acid (I- and the diglycidyl ethers or esters (II) used as starting materials are advantageously added in as pure a form as possible. At any rate, the dicarboxylic acid (I) should contain as impurity or admixture no more than 10 mol percent of monocarboxylic acid, and the diglycidyl ether or ester (II) as impurity or admixture no more than 20 mol percent preferably no more than 10 mol percent of monoepoxide; otherwise the chain would be broken off permanently and polyadducts would be formed that do no possess the desired crystalline structural properties at room temperature.

The polyaddition reaction is preferably carried out in the presence of an accelerator. Suitable accelerators are basic compounds, for example alkali or alkaline earth metal alcoholates, and more especially tertiary amines and their salts, such as benzyldimethylamine or triamylammonium phenolate. Further suitable accelerators are certain metal salts of organic acids, for example tin octoate or bismuth salicylate. As a rule, the addition reaction is performed within the temperature range from 100 to 200° C., preferably from 120 to 170° C. When 1% by weight of accelerator (for example 2-ethyl-4-methylimidazole or triamylammonium phenolate from 70.7 parts by weight of triamylamine and 29.3 parts by weight of phenol) is added, curing takes place as a rule at 120 to 140° C. within 16 hours. Alternatively, curing may be significantly accelerated by adding 3 to 10 times the amount of accelerator or performed at a lower temperature without impairing the mechanical properties. The crystallization conversion temperature (OCT) is in such cases often raised by a few degrees.

When shaped articles consisting of crystalline polymers of this invention are stretched (orientation of the microcrystalline regions) they display very high degrees of elongation at rupture of over 600% and strength values of over 100 to 200 kg./cm.² referred to the initial cross-section, and of over 1000 kg./cm.² referred to the stretched cross-section. The work absorption capacity (product of elongation at rupture and tensile strength, or, respectively, the content of the area resulting from the tensile strength test) is surprisingly high and surpasses the value of the previously known epoxy resin products crosslinked with the conventional curing agents by a potency of 10. Above the crystallization conversion temperature the shaped articles are as elastic as rubber and have a surprisingly high elongation at rupture of over 500%. The shaped articles display, especially in the crystalline state, a surprisingly high notch strength. The crystalline shaped articles of this invention are further distinguished by their relatively low water absorption; after 24 hours' immersion in water the recorded water absorption ranged from 0.6 to 0.1%, depending on the structure of the dicarboxylic acid. The hardness and above all the resilience in the rubber-elastic state of the shaped articles can be improved by raising the crosslinking density. This is achieved by adding a tricarboxylic acid or a triepoxy compound or preferably by adding a polycarboxylic acid anhydride and an excess of diepoxy compound. For this purpose there are added for every equivalent of carboxyl group of the dicarboxylic acid 0.05 to 0.3, preferably 0.1 to 0.2 mol of a dicarboxylic acid anhydride and an excess of 0.05 to 0.3, preferably 0.1 to 0.2 epoxide group equivalent of the diepoxy compound over and above the proportion required for reaction with the dicarboxylic acid as crosslinking agent for the polyadduct chain. The use of more than 30 mol percent of croslinking agent, referred to the carboxyl group equivalent of the dicarboxylic acid, should as a rule be avoided since, owing to the substantial rise in crosslinking density, this would in general lead to the formation of shaped articles having a lower elongation at rupture.

The crystalline polymers manufactured by the process of this invention probably consist of predominantly linear, high-molecular chain molecules consisting of recurrent structural elements of the formula (III)

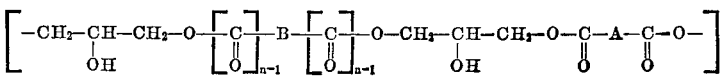

in which B represents a bivalent aliphatic, cycloaliphatic, araliphatic or aromatic residue and A a substantially linear residue in which polymethylene chains alternate in regular fashion with ether oxygen atoms or carboxylic acid ester groups, the quotient $Z:Q$—in which Z represents the number of carbon atoms present in the recurrent structural unit of the residue A and Q represents the number of oxygen bridges present in the recurrent structural unit of the residue A—is at least 5 and preferably at least 6, and the total number of carbon atoms in the carbon chains alttrnating in the residue A is at least 50, and $n=1$ or 2.

In the crystalline products additionally crosslinked by the addition of a small proportion of a crosslinking agent, especially a dicarboxylic acid anhydride, probably at least 0.05 and at most 0.3, preferably 0.1 to 0.2 mol percent of the hydroxyl groups distributed along the polyadduct chains are in esterified form; in each case two hydroxyl groups are esterified in this manner from vicinal polyadduct chains are linked together through a bivalent organic residue so that a wide-mesh three-dimensional lattice of polyadduct chains with isolated linking positions between the chains is formed.

Dicarboxylic acids of the Formula I suitable for the manufacture of the new crystalline synthetics are especially acid polyesters containing two terminal carboxyl groups, as are formed by polycondensation of aliphatic dicarboxylic acids with aliphatic diols; the chain of such polyesters consists of the regularly alternating basic building block of the dicarboxylic acid and of the regularly alternating basic building block of the diol. The recurrent structural unit, that is to say the smallest recurrent chemical grouping in the chain, is formed by the two basic building blocks linked by an ester bond, of the dicarboxylic acid and the dialcohol and corresponds to the formula

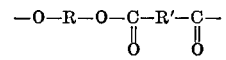

in which R represents the hydrocarbon residue of the diol and R' the hydrocarbon residue of the dicarboxylic acid. The dicarboxylic acid and the diol to be used in the synthesis of the acid polyester must be selected so that the sum of the number of the carbon atoms of the dicarboxylic acid and of the number of carbon atoms of the diol, divided by the two oxygen bridge atoms of the structural unit, is at least 5 and preferably at least 6. For example: An acid polyester of adipic acid and ethyleneglycol, in which the sum of the carbon atoms in the dicarboxylic acid and the diol (=8), divided by the oxygen bridges (=2) is only 4, is therefore completely unsuitable for the purposes of the present invention and furnishes no crystalline products. As a rule, at least one of the two basic building blocks should contain at least 6 carbon atoms.

Furthermore, the molecular ratio between the aliphatic dicarboxylic acid and the aliphatic dialcohol used in the polycondensation should be selected so that the sum total of carbon atoms present in the alternating structural elements of the polyester chain formed should be at least 50. As aliphatic dicarboxylic acids containing at least 6 carbon atoms, preferably used for the synthesis of such acid polyesters, there may be mentioned adipic, pimelic, suberic, azelaic, sebacic, nonanedicarboxylic, decanedicarboxylic, undecanedicarboxylic and dodecanedicarboxylic acid.

As aliphatic diols containing at least 6 carbon atoms, preferably used in the synthesis of the present acid polyesters, there may be mentioned: 1,6-hexanediol, 1,7-heptanediol, 1,8-octanediol, 1,9-nonanediol, 1,10-dicanediol, 1,11-undecanediol and 1,12-dodecanediol.

When a higher dicarboxylic acid, such as adipic or sebacic acid, is used for the synthesis of the acid polyester it is possible to use a lower aliphatic diol, for example ethyleneglycol, 1,3-propanediol, 1,4-butanediol or 1,5-pentanediol. Conversely, when a higher diol, such as 1,6-hexanediol or 1,10-dicanediol, is used for synthesizing the acid polyester a lower aliphatic dicarboxylic acid may be used, for example succinic or glutaric acid. However, when choosing the components of the combination dicarboxylic acid+diol it must be ensured that the condition $Z:Q$=at least 5, is always strictly observed.

The preferably used acid polyesters thus correspond as a rule to the formula

V) 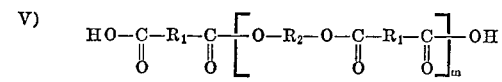

in which $R_1$ and $R_2$ represent polymethylene chains, and each of the two residues $R_1$ and $R_2$ must contain at least so many carbon atoms that the sum total of the carbon atoms present in $R_1+R_2$ is at least 8, and the number $m$ is chosen so that the product of $m$ and the sum (C-atoms in $R_1$+C-atoms in $R_2$+2) is at least 50.

Particularly good results are obtained with acid polyesters of hexanediol and adipic or sebacic acid, the molecular ratio of the diol to the dicarboxylic acid being about 10:11.

Further suitable for the purposes of this invention are the acid polyesters accessible by adding $(a+b)$ mols of a lactone on to 1 mol of an aliphatic dicarboxylic acid according to the reaction scheme (V)

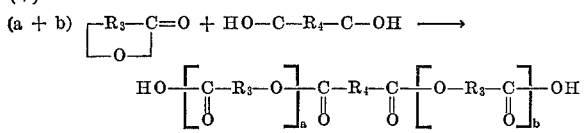

in which $R_3$ represents a polymethylene chain with at least 4 and preferably at least 5 carbon atoms, $R_4$ represents an aliphatic hydrocarbon residue and the numbers $a$ and $b$ chosen so that the product of $(a+b)$ and the sum (C-atoms in $R_3+1$) is at least 50.

With this type of compounds the alternating basic building block is identical with the recurrent structural unit in the chain so that the structural unit contains a single oxygen bridge. The quotient $Z:Q$ is therefore in this case equal to the number of carbon atoms of the lactone used in the synthesis of the acid polyester.

As relevant example there may be mentioned the adducts of $(a+b)$ mols of ε-caprolactone or exaltolide (=lactone of 15-hydroxyheptadecanoic acid) on to 1 mol of maleic, succinic, adipic or sebacic acid.

Polyesters synthesized in this manner are specially suitable for use in the present process. Shaped articles manufactured from these polyesters are distinguished by their specially high mechanical strength and relatively high crystallization conversion temperature.

The present process may also be performed with the acid condensates of 2 mols of an aliphatic dicarboxylic acid, such as maleic, succinic, adipic or sebacic acid, or of 2 mols of a dicarboxylic acid anhydride such as maleic anhydride, with 1 mol of a polyglyol of the formula (VI)

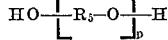

in which $R_5$ represents a polymethylene chain with at least 5 and preferably at least 6 carbon atoms (for example polyhexamethyleneglycol) and in which the number $p$ is selected so that the product of $p$ and the number of carbon atoms in R- is at least 50.

Such acid condensates thus correspond as a rule to the formula (VII)

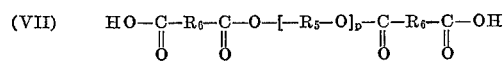

in which $R_5$ and $p$ have the same meanings as in Formula VI and $R_6$ represents an aliphatic hydrocarbon residue.

Accordingly, also in this group of compounds the alternating basic building block and the recurrent structural unit in the chain are identical so that the structural unit contains a single oxygen bridge, and the quotient $Z:Q$ becomes equal to the number of the carbon atoms of the glycol which makes up the chain of the polyglycol.

As diepoxides reacted with the dicarboxylic acids of the Formula I according to the present process there are especially suitable those whose molecular weight is not too high, namely as a rule diepoxides having an epoxide equivalent weight not greater than 500. Diepoxides having a relatively low molecular weight, especially those having an epoxide equivalent weight of about 100 to 250, are in general particularly suitable for the manufacture of crystalline products.

Suitable diepoxides are, for example, alicyclic diepoxides such as vinylcyclohexene dioxide, limonene dioxide, dicyclopentadiene dioxide, ethyleneglycol-bis-(3,4-epoxytetrahydrodicyclopentadien - 8 - yl)-glycidyl ether; compounds containing two epoxycyclohexy residues such as diethyleneglycol-bis-(3,4-epoxy-cyclohexanecarboxylate), bis-(3,4-epoxycyclohexylmethyl)succinate,
3,4-epoxy-6-methylcyclohexylmethyl-3,4-epoxy-6-methyl-cyclohexanecarboxylate and
3,4-epoxy-hexahydrobenzal-3,4-epoxycyclohexane-1,1-dimethanol.

Furthermore, basic polyepoxy compound are suitable such as are obtained by reacting primary aromatic monoamines, such as aniline or toluidine, or secondary aromatic diamines, such as 4,4'-di(monomethylamino)di-phenylmethane, with epichlorohydrin in the presence of alkali.

Diglycidyl ethers or diglycidyl esters are preferred.

As diglycidyl esters to be reacted with the dicarboxylic acids of the Formula I in the present process there are specially suitable those which have been obtained by reacting a dicarboxylic acid with epichlorohydrin or dichlorohydrin in the presence of alkali; such diesters may be derived from aliphatic dicarboxylic acids, such as succinic, adipic or sebacic acid, or from aromatic dicarboxylic acids, such as phthalic, isophthalic or terephthalic acid, or especially from hydroaromatic dicarboxylic acids, such as tetrahydrophthalic, hexahydrophthalic or 4-methylhexahydrophthalic acid. There may be mentioned, for example, diglycidyl phthalate, diglycidyl terephthalate, diglycidyl tetrahydrophthalate and diglycidyl hexahydrophthalate.

The diglycidyl ethers to be reacted with dicarboxylic acids of the Formula I according to this invention are preferably those obtained by etherifying a dihydric alcohol or diphenol with epichlorohydrin or dichlorohydrin in the presence of alkali. These compounds may be derived from glycols, such as ethyleneglycol, diethyleneglycol, triethyleneglycol, 1,3-propyleneglycol, 1,4-butanediol, 1,5-pentanediol, 1,6-hexanediol, nitrogeneous dialcohols such as N-phenyldiethanolamine and especially from diphenols, such as resorcinol,
pyrocatechol,
hydroquinone,
1,4-dihydroxynaphthalene,
bis(p-hydroxyphenyl)methane,
bis(p-hydroxyphenyl)methylphenylmethane,
bis(p-hydroxyphenyl)tolylmethane,
4,4'-dihydroxydiphenyl,
bis(p-hydroxyphenyl)sulphone or preferably from bis(p - hydroxyphenyl)dimethylmethane.

There may be specially mentioned the diglycidyl ethers derived from bis(p - hydroxyphenyl)dimethylmethane (bisphenol A), corresponding to the average formula

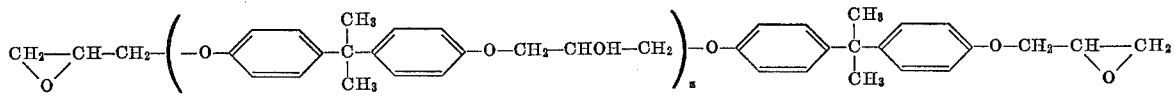

in which $z$ is a whole or fractional small number, for example from 0 to 2.

If desired, there may be additionally used a crosslinking agent, for example a triepoxy compound, such as triglycidyl isocyanurate or N,N',N''-tri(3-glycidyl-oxypropionyl(-hexahydro-s-triazine or a tricarboxylic acid, such as tricarballylic acid. Preferred crosslinking agents are, however, polycarboxylic acid anhydrides, especially dicarboxylic acid anhydrides. As examples there may be mentioned phthalic, tetrahydrophthalic, hexahydrophthalic, methylhexahydrophthalic, endomethylene-tetrahydrophthalic, methyl - endomethylene-tetrahydrophthalic (=methyl nadic anhydride), hexachloro-endomethylene-tetrahydrophthalic, succinic, adipic, azelaic, maleic, allylsuccinic, dodecylsuccinic anhydride; 7-allyl-bicyclo (2.2.1)-hept-5-ene-2,3-dicarboxylic anhydride, pyromellitic dianhydride or mixtures of such anhydrides.

According to the present process the crystalline polymers are as a rule manufactured with simultaneous shaping to form castings, foamed products, mouldings, lacquer films, laminates, adhesive bonds or the like. The procedure is as follows: A blend of the dicarboxylic acid (I) and the diepoxide or the diglycidyl ether or ester (II) and, if desired, additionally a basic catalyst and/or crosslinking agent (for example dicarboxylic acid anhydride) is prepared, then filled into casting dies or moulds, or spread in the form of a coating, or introduced into joints as adhesive films, whereupon the blend is reacted at an elevated temperature to form the polymer.

Accordingly, the present invention includes also curable compositions which can be converted with heating into shaped articles including two-dimensional shaped products, such as coatings or adhesive joints, containing a dicarboxylic acid of the Formula I and a diepoxide or a diglycidyl ether or ester of the Formula II and, if desired, also a basic curing accelerator and/or an additional crosslinking agent, especially a dicarboxylic acid anhydride. When no additional crosslinking agent has been used, the mixture contains as a rule for every equivalent of epoxide groups 0.8 to 1.1 equivalents of carboxyl groups. When a dicarboxylic acid anhydride is used as crosslinking agent, it is in general used in an amount of 0.05 to at most 0.3 mol for every equivalent of carboxyl groups of the dicarboxylic acid (I), and in such a case the mixture should further contain an excess of 0.05 to 0.3 epoxide group equivalent of the diepoxy compound over the quantity of epoxy groups required for the reaction with the dicarboxylic acid.

The diepoxide, the dicarboxylic acid and, if desired, additives may also be mixed, as a rule easily, at an elevated temperature to form a melt of low to medium viscosity having a relatively long pot life. It is a special advantage of the new curable compositions that they display low exothermic heat and low shrinkage during their conversion into the crystalline cured polymer. The shrinkage is particularly low after completed gelling (0.2 volume percent shrinkage when an acid polyester from 11 mols of sebacic acid and 10 mols of 1,6-hexanediol is used. These properties make it possible to cast even large objects rapidly and to cure them without setting up significant internal stresses. The moulding compositions may, of course, contain the usual additives, such as fillers, reinforcing agents, mould release agents, anti-ageing substances, flame-proofing agents, dyestuffs or pigments.

Suitable fillers or reinforcing agents are fibrous or pulverulent inorganic or organic substances. As inorganic fillers there may be mentioned quartz meal, hydrated alumina, mica, aluminium powder, iron oxide, ground dolomite, ground chalk, gypsum, ground slate, unburnt kaolin, (bolus), burnt kaolin (registered trademark Molochit); as organic fillers there may be mentioned wood meal and cellulose.

Suitable reinforcing agents are inorganic, fibrous substances, for example glass fibres, boron fibres, carbon fibres, asbestos fibres or organic natural or synthetic fibres, such as cotton, polyamide, polyester of polyacrylonitrile fibers.

The curable compositions of this invention are specially suitable as laminating resins for the manufacture of laminates using as substrates, for example, woven fabrics, braided fabrics, knitted fabrics, fibre mats or fleeces made of fibrous materials. There may be mentioned paper, cottonwool, linen or cotton papers, canvas, preferably asbestos paper, mica paper, mats or fabrics made from high-melting synthetic polymer fibres and especially glass fibre mats or glass fibre fabrics. The substrates are impregnated in known manner with the composition of the invention, consisting of the diepoxide and the dicarboxylic acid, as in the form of a liquid melt and then in known manner compressed with application of heat and pressure to form laminates which display an extremely good shock absorption. Such laminates may be used, for example, for the manufacture of parts of motorcar bodies, crash helmets or the like.

Furthermore, the moulding compositions in the unfilled or filled state may be used as coating compositions, paints, lacquers, dipping resins, casting resins, moulding compositions, grouting and sealing compositions, floorings, potting and encapsulating compositions for insulating purposes in the electrical industry, adhesives, preferably for soft metals, and for the manufacture of such products.

Unless otherwise indicated, parts and percentages in the following examples are by weight. The relationship between parts by volume and parts by weight is the same as that between the millilitre and the gram.

In the manufacture of the crystalline polymers described in the examples the following acid polyesters and polyethers respectively were used:

Polyester A.—A mixture of 808 g. of sebacic acid and 378 g. of 1,6-hexanediol (=molecular ration 5:4) was heated under nitrogen at 145° C. and then while being stirred for 10 hours at 230° C., while continuously distilling off the water resulting from the polycondensation. The last remnants of condensation water were distilled off at 230° C. under a vacuum of 15 mm. Hg. The reaction product A had an acid equivalent weight of 690 (theory: 670).

Polyester B.—A mixture of 584 g. of adipic acid and 429 g. of 1,6-hexanediol (=molecular ratio 11:10) was heated to 127° C. and then while being stirred for 6½ hours at 252° C., while continuously distilling off the water resulting from the polycondensation. The residual moisture was then removed at 252° C. under 17 mm. Hg pressure. The resulting acid polyester B had an acid equivalent weight of 1150 (theory: 1213).

Polyester C.—A mixture of 657 g. of sebacic acid and 597 g. of 1,12-dodecanediol (=molecular ratio 11:10) was heated under nitrogen to 145° C. and then stirred for 10 hours was heating at 231° C., while continuously distilling off the water resulting from the polycondensation. The last remnants of condensation water were distilled off under 15 mm. Hg at 235° C. within 2 hours. The resulting acid polyester C had an acid equivalent weight of 2195 (theory: 1946).

Polyester D.—A mixture of 1414 g. of sebacic acid and 750 g. of 1,6-hexanediol (corresponding to 10 mols of 1,6-hexanediol for 11 mols of sebacic acid) was heated under nitrogen to 135° C. and then while being stirred for 6 hours heated at 230° C., while continuously distilling off the water formed by the polycondensation. The last remnants of condensation water were removed during one hour at 230° C. under a vacuum of 13 mm. Hg. The reaction product was white and crystalline and melted at 55° C. The acid equivalent weight was 1570 g. (theory: 1521).

Polyester E.—A mixture of 808 g. of sebacic acid and 277 g. of propanediol (=molecular ratio 11:10) was heated under nitrogen to 148° C. and then within 7 hours while stirring at 215° C., while continuously distilling off the water stirring at 215° C., while continuously distilling off the water formed by the polycondensation. The last remnants of condensation water were distilled off by heating for 1 hours at 185° C. under a vacuum of 18 mm. Hg. The reaction product was white and crystalline and melted at 42° C. The acid equivalent weight was 809 g. (theory: 1492).

Polyester F.—A mixture of 808 g. of sebacic acid and 323 g. of 1,4-butanediol (=molecular ration 11:10) was heated under nitrogen to 155° C. and then with stirring for 5½ hours at 250° C., while continuously distilling off the water formed by the polycondensation. The last remnants of condensation water were distilled off within 1 hour at 183° C. under a vacuum of 16 mm. Hg. The reaction product was white and crystalline and melted at 55° C. The acid equivalent weight was 1098 g. (theory: 1494).

Polyester G.—A mixture of 672 g. of succinic acid and 1046 g. of 1,12-dodecanediol (=molecular ratio 11:10) was heated under nitrogen to 146° C. and then with stirring for 6 hours at 235° C., while continuously distilling off the water resulting from the polycondensation. The last remnants of water of condensation were removed at 237° C. under a vacuum of 10 mm. Hg. The reaction product was white and crystalline and melted at 74° C. Acid equivalent weight 4915 g. (theory: 1480).

Polyester H.—A mixture of 322 g. of $\omega,\omega'$-decanedicarboxylic acid and 79 g. of ethyleneglycol (=molecular ratio 11:10) was heated under nitrogen to 145° C. and then with stirring for 6 hours at 204° C., while continuously distilling off the water resulting from the polycondensation. The last remnants of water of condensation were removed by heating for 3½ hours at 205° C. under a vacuum of 15 mm. Hg. The reaction product was white and crystalline and melted at 82° C. Acid equivalent weight 895 g. (theory: 1377).

Polyester I.—A mixture of 584 g. of adipic acid and 429 g. of 1,6-hexanediol (=molecular ratio 11:10), 1 kg. of xylene and 5 g. of p-toluenesulphonic acid was heated to the boil and during 7 hours the water resulting from the polycondensation was distilled off azeotropically by the recycling method. The resulting reaction product was freed from the catalyst by filtration and treated in a rotary evaporator at 130° C. until its weight remained constant (by distillative removal of the xylene); the reaction product melted at 49° C. and was crystalline and white. Acid equivalent weight 1046 g. (theory: 1213).

Polyester K.—A mixture of 730 g. of adipic acid, 536 g. of 1,6-hexanediol (=molecular ratio 11:10) and 6.35 g. of p-toluenesulphonic acid was heated under nitrogen to 116° C. While stirring for 3½ hours the batch was heated to 173° C., while continuously distilling off the water formed by the polycondensation. The last remnants of condensation water were removed in the course of 1 hour at 180° C. under a vacuum of 13 mm. Hg. The reaction product was white and crystalline and melted at 48° C. Acid equivalent weight 1020 g. (theory: 1213).

Acid polyether-ester L.—A mixture of 664 g. of polyhexamethyleneglycol (molecular weight 664) and 200 g. of succinic anhydride (molecular ratio 1:2) was heated within 1 hour to 170° C. The reaction product revealed an acid equivalent weight of 432 g.

Acid polyether-ester M.—A mixture of 684 g. of polyhexamethyleneglycol (molecular weight 684) and 368 g. of sebacic anhydride (=molecular ratio 1:2) was heated for 1 hour at 170° C. The reaction product had an acid equivalent weight of 526 g.

Polyester N.—A mixture of 730 g. of adipic acid and 427 g. of 1,4-butanediol (=molecular ratio 20:19) was heated under nitrogen to 145° C. and with stirring for 7 hours heated at 230° C., while continuously distilling off the water released by the polycondensation. The last remnants of condensation water were removed within 1 hour at 230° C. under a vacuum of 15 mm. Hg. The reaction product revealed an acid equivalent weight of 1274 (theory: 1973).

Polyester O.—A mixture of 606 g. of sebacic acid and 347 g. of 1,6-hexanediol (=molecular ratio 51:50) was heated under nitrogen to 160° C. and then while being stirred for 5 hours heated to 221° C., while continuously distilling off the water released by the polycondensation. The last remnants of water of condensation were removed within 3 hours at 221° C. under a vacuum of 15 mm. Hg. The reaction product had an acid equivalent weight of 2855 (theory: 2700) and melted at 65° C.

Polyester P.—The starting materials used were 400 g. of ε-caprolactone and 19.7 g. of adipic acid, corresponding to a molecular ratio of 26:1, and 0.2% of dibutyl tin oxide was added as catalyst. The lactone was polymerized in the melt at 170° C. with continuous stirring. After 15 hours a viscous melt had formed which was purified for another 1 to 2 hours under a vacuum of 10 mm. Hg until no more gas was being evolved.

The reaction product solidified to form a bright substance melting at 55° C. The acid equivalent weight was 1430 corresponding to 92% of the theoretical.

Polyester Q.—This ester was manufactured as described for polyester P by polymerizing 500 g. of ε-caprolactone and 34 g. of sebacic acid (=molecular ratio 26:1) in the presence of 0.2% of dibutyl tin oxide as catalyst. The reaction product was a bright substance having an acid equivalent weight of 1580, corresponding to 102% of the theoretical. Its melting point was 58°C.

EXAMPLE 1

100 grams of a bisphenol A-diglycidyl ether (obtained by condensing epichlorohydrin with bis(p-hydroxyphenyl) dimethylmethane [=bisphenol A] in the presence of alkali) which was liquid at room temperature and contained 5.35 epoxide equivalents per kg. were mixed at 80° C. with 358 g. of the acid polyester A and 1 g. of triamylammonium phenolate, evacuated and poured into the moulds. After a heat treatment for 21½ hours at 140° C. and then for 3 hours at 160° C. a crystalline, dim casting was obtained which possessed the following properties:

Crystallization conversion temperature _____° C__ 39
Tensile strength (VSM 77 101) _____kg./cm.$^2$__ 100
Elongation at rupture _____percent__ 326
Water absorption after 4 days at 20° C. _____do____ 0.33

Measuring the crystallinity

The crystallization conversion temperatures were measured with a differential calorimeter. When a resin is heated at a uniform speed and the crystals melt, the resin takes up a great deal of energy within a relatively close temperature range. The temperature at which the energy absorption is greatest is called the crystallization conversion temperature (CCT). In the method here used the energy was measured directly instead of being determined via a temperature difference with a control specimen. Another measure of the crystallinity was obtained by measuring the change in volume as a function of the temperature. A casting of polyester D revealed in the region of the CCT a volume contraction of 4.9%, which suggests a relatively large share of crystalline constituents.

EXAMPLE 2

100 grams of the bisphenol A-diglycidyl ether, containing 5.35 epoxide equivalents per kg., used in Example 1 were mixed at 80° C. with 328 g. of the acid polyester A, 7.1 g. of hexahydrophthalic anhydride and 1 g. of dimethylbenzylamine, evacuated and then poured into the prewarmed moulds. After a heat treatment for 21½ hours at 140° C. and then for 3 hours at 160° C. a crystalline, dim casting was obtained which revealed the following properties:

Crystallization conversion temperature _____° C__ 38
Tensile strength (VSM 77 101) _____kg./cm.$^2$__ 160
Elongation at rupture _____ percent__ >690

EXAMPLE 3

A mixture of 950 g. of the acid polyester A and 50 g. of sebacic anhydride was heated for 30 minutes at 140° C. Then 349 g. of this mixture were mixed at 10° C. with 100 g. of the bisphenol A-diglycidyl ether (containing 5.35 epoxide equivalents per kg.) used in Example 1 and 1 g. of triamylammonium phenolate, then evacuated and poured into the pre-warmed moulds. After a heat treatment for 16 hours at 140° C. and then for 2 hours at 160° C. castings were obtained which possessed the following properties:

Crystallization conversion temperature ° C__ 46
Tensile strength (VSM 11 101) kg./cm.² 70
Elongation at rupture percent__ 570
Water absorption after 4 days at 20° C. do__ 0.46

EXAMPLE 4

A mixture of 672 g. of the acid polyester B, 100 g. of the bisphenol A-diglycidyl ether used in Example 1, containing 5.35 epoxide equivalents per kg., 12.1 g. of dodecenylsuccinic anhydride and 1 g. of triamylammonium phenolate was heated to 110° C., thoroughly stirred, evacuated and poured into a pre-warmed mould. After a heat treatment for 16 hours at 140° C. and then for 5 hours at 170° C. crystalline, tough castings were obtained which possessed the following properties:

Crystallization conversion temperature ° C__ 42
Tensile strength (VSM 77 101) kg./cm.²__ 120
Elongation at rupture percent__ >700

EXAMPLE 5

A mixture of 439 g. of the acid polyester B, 100 g. of the bisphenol A-diglycidyl ether used in Example 1 (containing 5.35 epoxide equivalents per kg.), 11 g. of dodecenylsuccinic anhydride, 1 g. of triamylammonium phenolate and 1.1 g. of bismuth salicylate was heated to 10° C., thoroughly stirred, evacuated and poured into the pre-warmed moulds. After a heat treatment for 16 hours at 140° C. and then for 3 hours at 170° C. castings were obtained which revealed the following properties:

Crystallization conversion temperature ° C__ 37
Tensile strength (VSM 77 101) kg./cm.²__ 129
Elongation at rupture percent__ 540

EXAMPLE 6

A mixture of 439 g. of the acid polyester B, 81.2 g. of tetrahydrophthalic acid diglycidyl ester (containing 6.7 epoxide equivalents per kg.), 11 g. of dodecenylsuccinic anhydride and 1 g. of triamylammonium phenolate was heated to 90° C., thoroughly stirred, evacuated and poured into pre-warmed moulds. After a heat treatment for 16 hours at 140° C. and then for 4 hours at 160° C. the resulting casting revealed the following properties:

Crystallization conversion temperature ° C__ 43
Tensile strength (VSM) 77 101) kg./cm.²__ 90
Elongation at rupture percent__ >700

EXAMPLE 7

A mixture of 439 g. of the acid polyester B, 89.2 g. of hexahydrophthalic acid diglycidyl ester (containing 6.06 epoxide equivalents per kg.), 11 g. of dodecenylsuccinic anhydride and 1 g. of triamylammonium phenolate was heated to 90° C., thoroughly stirred, evacuated and poured into the pre-warmed moulds. After a heat treatment for 16 hours at 140° C. and for 4 hours at 160° C. tough, crystalline castings were obtained which possessed the following properties:

Crystallization conversion temperature ° C__ 43
Tensile strength referred to initial cross-section kg./cm.²__ 135
Tensile strength referred to stretched cross-section kg./cm.²__ 800
Elongation at rupture percent >700

EXAMPLE 8

A mixture of 848 g. of the acid polyester C, 100 g. of the bisphenol A-diglycidyl ether used in Example 1 (containing 5.35 epoxide equivalents per kg.), 16.7 g. of dodecenylsuccinic anhydride and 1 g. of triamylammonium phenolate was heated to 115° C., thoroughly stirred, evacuated and poured into the pre-warmed moulds. After a heat treatment for 16 hours at 140° C. and then for 4 hours at 180° C. the castings revealed the following properties:

Crystallization conversion temperature ° C__ 75
Tensile strength (VSM 77 101) kg./cm.²__ 152
Elongation at rupture percent__ 12
Water absorption do__ 0.08

When the accelerator used in the above example is 1 g. of 2-ethyl-4-methylimidazole instead of 1 g. of triamylammonium phenolate, castings result which possess the following properties:

Crystallization conversion temperature ° C__ 72
Tensile strength (VSM 77 101) kg./cm.²__ >216
Elongation at rupture percent__ >650

EXAMPLE 9

A mixture of 1020 g. of the acid polyester K, 222 g. of the bisphenol A-diglycidyl ether used in Example 1 (containing 5.35 epoxide equivalents per kg.), 53.2 g. of dodecenylsuccinic anhydride and 2.2 g. of 2-ethyl-4-methylimidazole was heated to 100° C., then thoroughly stirred, evacuated for a short time and poured into pre-warmed aluminium moulds (inside dimensions corresponding to 3 tensile test bars type ISO No. 2, identical with tensile test bars according to DIN 16 946; outside dimensions 23.5 x 5.0 x 3.5 cm.). Curing for 16 hours at 140° C. produced castings having the following properties:

Crystallization conversion temperature ° C__ 38
Tensile strength (VSM 77 101) kg./cm.²__ >166
Elongation at rupture percent— >600

Castings having identical properties are obtained when in the above example instead of the acid polyester K an identical quantity of the acid polyester I is used.

EXAMPLE 10

A mixture of 100 g. of the bisphenol A-diglycidyl ether used in Example 1 (containing 5.35 epoxide equivalents per kg.), 707 g. of the acid polyester D, 18 g. of dodecenylsuccinic anhydride and 1 g. of 2-ethyl-4-methylimidazole was heated to 110° C., then thoroughly stirred, evacuated for a short time and poured into pre-warmed aluminium moulds. Curing for 16 hours at 140° C. produced castings with the following properties:

Crystallization conversion temperature ° C__ 52
Tensile strength (VSM 77 101) kg./cm.²__ >216
Elongation at rupture percent__ >700

When in this example the 1 g. of 2-ethyl-4-methylimidazole is replaced by 7.3 g. of triamylammonium phenolate, castings are obtained which possess the following properties:

Crystallization conversion temperature ° C__ 50
Tensile strength (VSM 77 101) kg./cm.² [1]>160
Elongation at rupture percent__ [1]>700

[1] The test bars withstood these strains and stresses without rupturing.

EXAMPLE 11

A mixture of 100 g. of hexahydrophthalic acid diglycidyl ester (containing 6.06 epoxide equivalents per kg.), 732 g. of the acid polyester D, 23.8 g. of dodecenylsuccinic anhydride and 1 g. of 2,4,6-tris(dimethylaminomethyl)phenol was heated to 110° C., thoroughly stirred, evacuated for a short time and then poured into the pre-warmed moulds. After a heat treatment for 16 hours at 140° C. and then for 5 hours at 170° C. castings were obtained which possessed the following properties:

Crystallization conversion temperature ° C__ 52
Tensile strength (VSM 77 101) kg./cm.²__ >130
Elongation at rupture percent__ >600

EXAMPLE 12

A mixture of 240.5 g. of the bisphenol A-diglycidyl ether used in Example 1 (containing 5.35 epoxide equivalents per kg.), 809 g. of the acid polyester E, 53.2 g. of dodecenylsuccinic anhydride and 2.4 g. of 2-ethyl-4-methylimidazole was heated to 110° C., then thoroughly stirred and after a short evacuation poured into the prewarmed aluminium moulds. After a heat treatment for 16 hours at 150° C. the castings revealed the following properties:

Crystallization conversion temperature ____° C__ 28
Tensile strength (VSM 77 101) _____kg./cm.² __ >45
Elongation at rupture _____percent__ >600

EXAMPLE 13

A mixture of 214.5 g. of hexahydrophthalic acid diglycidyl ester (containing 6.06 epoxide equivalents per kg.), 809 g. of the acid polyester E, 53.2 g. of dodecenylsuccinic anhydride and 2.4 g. of 2-ethyl-4-methylimidazole was heated to 110° C., then thoroughly stirred and after a short vacuum treatment poured into the prewarmed aluminium moulds. After a heat treatment for 16 hours at 150° C. the castings revealed the following properties:

Crystallization conversion temperature _____° C__ 31
Tensile strength (VSM 77 101) _____kg./cm.²__ 86
Elongation at rupture _____percent__ 247

EXAMPLE 14

A mixture of 24.05 g. of the bisphenol A-diglycidyl ether used in Example 1 (containing 5.35 epoxide equivalents per kg.), 109.8 g. of the acid polyester F, 5.32 g. of dodecenylsuccinic anhydride and 0.24 g. of 2-ethyl-4-methylimidazole was heated to 110° C., then thoroughly stirred and after a short vacuum treatment poured into the pre-warmed aluminium moulds. After a heat treatment for 16 hours at 150° C. the resin castings revealed the following properties:

Crystallization conversion temperature _____° C__ 44
Tensile strength (VSM 77 101) _____kg./cm.²__ 179
Elongation at rupture _____percent__ 636

EXAMPLE 15

A mixture of 24.05 g. of the bisphenol A-diglycidyl ether used in Example 1 (containing 5.35 epoxide equivalents per kg.) 89.5 g. of the acid polyester G, 53.2 g. of dodecenylsuccinic anhydride and 0.24 g. of 2-ethyl-4-methylimidazole was heated to 110° C., then thoroughly stirred, heated for a short time and poured into the aluminium moulds. After a heat treatment for 16 hours at 150° C. the castings revealed the following properties:

Crystallization conversion temperature _____° C__ 62
Tensile strength (VSM 77 101) _____kg./cm.²__ 60
Elongation at rupture _____percent__ 40

EXAMPLE 16

A mixture of 21.45 g. of hexahydrophthalic acid diglycidyl ester (containing 6.06 epoxide equivalents per kg.), 491 g. of the acid polyester H, 53.2 g. of dodecenylsuccinic anhydride and 2.1 g. of 2-ethyl-4-methylimidazole was heated to 120° C., thoroughly stirred, evacuated for a short time and poured into the pre-warmed moulds. After a heat treatment for 16 hours at 150° C. the resin castings revealed the following properties:

Crystallization conversion temperature _____° C__ 81
Tensile strength (VSM 77 101) _____kg./cm.²__ 155
Elongation at rupture _____percent__ 21

EXAMPLE 17

A mixture of 13.2 g. of the cycloaliphatic diepoxy compound of the formula

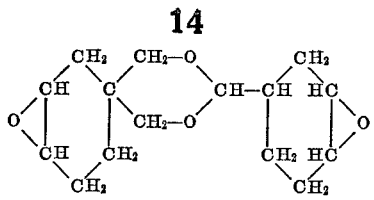

containing 6.2 epoxide equivalents per kg., 100 g. of the acid polyester D, 3.4 g. of dodecenylsuccinic anhydride and 0.4 g. of 2-ethyl-4-methylimidazole was heated to 110° C., thoroughly stirred, evacuated for a short time and poured into the prewarmed moulds. After a heat treatment for 16 hours at 140° C. and then for 4 hours at 180° C. the resin castings revealed the following properties:

Crystallization conversion temperature _____° C__ 54
Tensile strength (VSM 77 101) _____kg./cm.²__ 128
Elongation at rupture _____percent__ 26

EXAMPLE 18

A mixture of 214.5 g. of hexahydrophthalic acid diglycidyl ester (containing 6.06 epoxide equivalents per kg.), 432 g. of acid polyether-ester L, 53.2 g. of dodecenylsuccinic anhydride and 2.1 g. of 2-ethyl-4-methylimidazole was heated to 110° C., thoroughly stirred, evacuated for a short time and poured into the pre-warmed moulds. After a heat treatment for 16 hours at 150° C. the resin castings revealed the following properties:

Crystallization conversion temperature _____° C__ 26
Tensile strength (VSM 77 101) _____kg./cm.²__ 13
Elongation at rupture _____percent__ 333

EXAMPLE 19

A mixture of 214.5 g. of hexahydrophthalic acid diglycidyl ester (containing 6.06 epoxide equivalents per kg.), 526 g. of the acid polyether-ester M, 53.2 g. of dodecenylsuccinic anhydride and 2.1 g. of 2-ethyl-4-methylimidazole was heated to 110° C., then thoroughly stirred, evacuated for a short time and poured into the pre-warmed moulds. After a heat treatment for 16 hours at 150° C. the resin castings revealed the following properties:

Crystallization conversion temperature _____° C__ 30
Tensile strength (VSM 77 101) _____kg./cm.²__ 17
Elongation at rupture _____percent 541

EXAMPLE 20

A mixture of 22.6 g. of adipic acid diglycidyl ester (containing 8.8 epoxide equivalents per kg.), 157 g. of the acid polyester D, 11.9 g. of dodecenylsuccinic anhydried and 0.67 g. of 2-ethyl-4-methylimidazole was heated to 110° C., then thoroughly stirred, evacuated for a short time and poured into the pre-warmed aluminium moulds. After a heat treatment for 16 hours at 150° C. the resin castings revealed the following properties:

Crystallization conversion temperature _____° C__ 55
Tensile strength (VSM 77 101) _____kg./cm.²__ 96
Elongation at rupture _____percent__ 383

EXAMPLE 21

A mixture of 22.6 g. of adipic acid diglycidyl ester (containing 8.8 epoxide equivalents per kg.), 157 g. of the acid polyester D, 3.64 g. of sebacic anhydride and 0.67 g. of 2-ethyl-4-methylimidazole was heated to 110° C., then thoroughly stirred, evacuated for a short time and poured into the pre-warmed moulds. After a heat treatment for 16 hours at 150° C. the resin castings revealed the following properties:

Crystallization conversion temperature _____° C__ 58
Tensile strength (VSM 77 101) _____kg./cm.²__ 123
Elongation at rupture _____ ___percent__ 157

EXAMPLE 22

A mixture of 520 g. of a bisphenol A-diglycidyl ether obtained by condensing epichlorohydrin with bis(p-hydroxyphenyl)dimethylmethane (=bisphenol A) in the presence of alkali, which is solid at room temperature and contains 2.5 epoxide equivalents per kg., 1568 g. of polyester F and 5.2 g. of 2-ethyl-4-methylimidazole was heated to 110° C., then thoroughly stirred, evacuated for a short time and poured into the pre-warmed aluminium moulds. After a heat treament for 16 hours at 150° C. the resin castings revealed the following properties:

Crystallization conversion temperature _____° C__ 44
Tensile strength (VSM 77 101) _____kg./cm.$^2$__ 162
Elongation at rupture _____percent__ 585

EXAMPLE 23

A mixture of 520 g. of the bisphenol A-diglycidyl ether used in Example 22, containing 2.5 epoxide equivalents per kg., 1086 g. of an acid polyester of sebacic acid and dodecanediol (prepared as described for polyester C) having an acid equivalent weight of 1086, and 5.2 g. of 2-ethyl-4-methylimidazole was heated to 110° C., then thoroughly stirred, evacuated for a short time and poured into the pre-warmed aluminium moulds. After a heat treatment for 16 hours at 150° C. the resin castings revealed the following properties:

Crystallization conversion temperature _____° C__ 58
Tensile strength (VSM 77 101) _____kg./cm.$^2$__ 200
Elongation at rupture _____percent__ 483

EXAMPLE 24

(a) A mixture of 24.05 g. of the bisphenol A-diglycidyl ether used in Example 1 (containing 5.35 epoxide equivalents per kg.), 127.4 g. of the acid polyester N, 5.32 g. of dodecenylsuccinic anhydride and 0.24 g. of 2-ethyl-4-methylimidazole was heated to 110° C., then thoroughly stirred, evacuated for a short time to remove the air bubbles and poured into the pre-warmed moulds. After a heat treatment for 16 hours at 150° C., the resin castings revealed the following properties:

Crystallization conversion temperature _____° C__ 35
Tensile strength (VSM 77 101) _____kg./cm.$^2$__ 173
Elongation at rupture _____percent__ 570

(b) When 21.45 g. of hexahydrophthalic acid diglycidyl ester (containing 6.06 epoxide equivalents per kg.) are used instead of bisphenol A-diglycidyl ether, the other reactants and the reaction conditions being as described in Example 24(a), the following values were obtained:

Crystallization conversion temperature _____° C___ 41
Tensile strength (VSM 77 101) _____kg./cm.$^2$__ 170
Elongation at rupture _____ percent__ 650

EXAMPLE 25

A mixture of 115 g. of the acid polyester B, 17.1 g. of N,N' - diglycidyl-5,5-dimethylhydantoin (containing 7.2 epoxide equivalents per kg.) and 5.32 g. of dodecenylsuccinic anhydride was heated to 100° C., thoroughly stirred, evacuated for a short time and poured into the pre-warmed moulds. After a heat treatment for 16 hours at 140° C. the following properties were found:

Crystallization conversion temperature _____° C__ 43
Tensile strength (VSM 77 101) _____kg./cm.$^2$__ 81
Elongation at rupture _____percent__ 19

EXAMPLE 26

A mixture of 285.5 g. of polyester O, 24.0 g. of the bisphenol A-diglycidyl ether used in Example 1, 5.32 g. of dodecenylsuccinic anhydride and 0.24 g. of 2-ethyl-4-methylimidazole was heated to 120° C., thoroughly stirred, evacuated for a short time and poured into the moulds. After a heat treatment for 16 hours at 140° C. the castings revealed the following properties:

Crystallization conversion temperature _____° C__ 60
Tensile strength (VSM 77 101) _____kg./cm.$^2$__ 110
Elongation at rupture _____percent__ 100

EXAMPLE 27

(a) A mixture of 143 g. of polyester P, 24.0 g. of the bisphenol A-diglycidyl ether used in Example 1, 5.32 g. of dodecenylsuccinic anhydride and 0.24 g. of 2-ethyl-4-methylimidazole was thoroughly stirred, evacuated for a short time to remove the air bubbles and poured into the pre-warmed moulds. After a heat treatment for 16 hours at 140° C. the castings revealed the following properties:

Crystallization conversion temperature ___° C__ 45
Tensile strength (VSM 77 101) ____kg./cm.$^2$__ $^1$>210
Elongation at rupture _____percent__ 670

$^1$ Test bar ruptured in the clamping device.

(b) When 20.3 g. of tetrahydrophthalic acid diglycidyl ester instead of bisphenol A-diglycidyl ether and 3.08 g. of hexahydrophthalic anhydride instead of dodecenylsuccinic anhydride are used, all other conditions being as described in Example 27(a), the following results are obtained:

Crystallization conversion temperature _° C__ 41 and 46
Tensile strength (VSM 77 101) ____kg./cm.$^2$__ $^1$>240
Elongation at rupture _____percent__ 670

$^1$ Test bar ruptured in the clamping device.

EXAMPLE 28

A mixture of 155.5 g. of polyester Q, 24.0 g. of the bisphenol A-diglycidyl ether used in Example 1, 5.32 g. of dodecenylsuccinic anhydride and 0.24 g. of 2-ethyl-4-methylimidazole was heated to 100° C., thoroughly stirred, evacuated for a short time to remove the air bubbles and poured into the pre-warmed moulds. After a heat treatment for 16 hours at 140° C. the castings revealed the following properties:

Crystallization conversion temperature _____° C__ 49
Tensile strength (VSM 77 101) _____kg./cm.$^2$__ 199
Elongation at rupture _____percent__ 635

EXAMPLE 29

This example is a reproduction of Example 1 of U.S. Pat. No. 3,299,008.

20.4 parts of Polyether A which is a polyglycidyl-ether of bisphenol A having an epoxy value eq./100 g. of 0.50 was combined with 79.58 parts of an adduct of polyethylene glycol and succinic anhydride having a molecular weight of 1200 and an acidity of 1.90 M eq./gm., and 1% of tris-(dimethylaminomethyl)phenol. The mixture was blended with stirring and heated for 16 hours at 120° C. The obtained product was liquid at 120° C. and after cooling to room temperature a high-viscous, sticky product resulted, which showed no mechanical strength.

What is claimed is:

1. A curable composition of matter, which by application of heat can be converted into a crystalline polymeric product having high elongation at rupture and high tensile strength, said composition comprising (a) a 1,2-diepoxy compound;
(b) a long-chain dicarboxylic acid of the formula

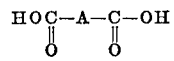

in which A represents a predominantly linear residue in which polymethylene chains alternate in a regular manner with a grouping selected from the group consisting of ether oxygen atom and carboxylic acid ester group, the quotient $Z:Q$ (in which Z represents the number of carbon atoms in the recurrent structural unit of residue A, and Q the number of oxygen bridges in the recurrent structural unit of residue A) being at least 5, and the total number of carbon atoms in alternating carbon chains in residue A being at least 50, there being present for every equivalent of epoxide groups of diepoxy compound (a) to be reacted with component (b) 0.7 to 1.2 equivalents of carboxyl groups of dicarboxylic acid (b); and (c) a dicarboxylic acid anhydride as crosslinking agent in such proportion, that for every equivalent of carboxyl groups of the dicarboxylic acid (b) there are present 0.05 to 0.3 mol of the dicarboxylic acid anhydride (c), with the further proviso that an excess of 0.05 to 0.3 epoxide group equivalent of diepoxy compound (a) over the quantity of epoxide groups required for the reaction with the dicarboxylic acid (b) must be additionally present for the reaction with the component (c).

2. A curable composition of matter, which by application of heat can be converted into a crystalline polymeric product having high elongation at rupture and high tensile strength, said composition comprising (a) a 1,2-diepoxy compound;
(b) a long-chain dicarboxylic acid of the formula

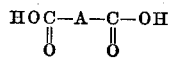

in which A represents a predominantly linear residue in which polymethylene chains alternate in a regular manner with a grouping selected from the group consisting of ether oxygen atom and carboxylic acid ester group, the quotient $Z:Q$ (in which Z represents the number of carbon atoms in the recurrent structural unit of residue A, and Q the number of oxygen bridges in the recurrent structural unit of residue A) being at least 5, and the total number of carbon atoms in alternating carbon chains in residue A being at least 50, there being present for every equivalent of epoxide groups of diepoxy compound (a) to be reacted with component (b) about 0.9 to about 1.0 equivalent of carboxyl groups of dicarboxylic acid (b); and (c) a dicarboxylic acid anhydride as crosslinking agent in such proportion that for every equivalent of carboxyl groups of the dicarboxylic acid (b) there are present about 0.1 to about 0.2 mol of the dicarboxylic acid anhydride (c), with the further proviso that an excess of about 0.1 to about 0.2 epoxide group equivalent of diepoxy compound (a) over the quantity of epoxide groups required for the reaction with the dicarboxylic acid (b) must be additionally present for the reaction with the component (c).

3. A curable composition of matter, which by application of heat can be converted into a crystalline polymeric product having high elongation at rupture and high tensile strength, said composition comprising (a) a 1,2-diepoxy compound;
(b) a long-chain dicarboxylic acid of the formula

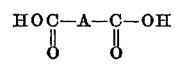

in which A represents a predominantly linear residue in which polymethylene chains alternate in a regula manner with a grouping selected from the group consisting of ether oxygen atom and carboxylic acid ester group, the quotient $Z:Q$ (in which Z represents the number of carbon atoms in the recurrent structural unit of residue A, and Q the number of oxygen bridges in the recurrent structural unit of residue A) being at least 5, and the total number of carbon atoms in alternating carbon chains in residue A being at least 50, there being present for every equivalent of epoxide groups of diepoxy compound (a) to be reacted with component 0.7 to 1.2 equivalents of carboxyl groups of dicarboxylic acid (b); (c) a dicarboxylic acid anhydride as crosslinking agent in such proportion, that for every equivalent of carboxyl groups of the dicarboxylic acid (b) there are present 0.05 to 0.3 mol of the dicarboxylic acid anhydride (c), with the further proviso that an excess of 0.05 to 0.3 epoxide group equivalent of diepoxy compound (a) over the quantity of epoxide required for the reaction with the dicarboxylic acid (b) must be additionally present for the reaction with the component (c); and (d) a basic curing accelerator.

4. A composition as claimed in claim 1, wherein the diepoxy compound (a) has an epoxide equivalent weight not greater than 500.

5. A composition as claimed in claim 4, wherein the diepoxy compound (a) has an epoxide equivalent weight from 100 to 250.

6. A composition as claimed in claim 1, wherein the diepoxy compound (a) is a diglycidyl compound of the formula

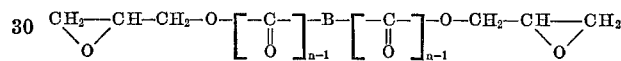

in which B represents a member selected from the group consisting of bivalent aliphatic, cycloaliphatic, araliphatic and aromatic radical and $n$ is an integer of at least 1 and at most 2.

7. A composition as claimed in claim 1, wherein the dicarboxylic acid (b) has the formula

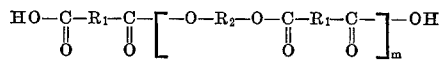

in which $R_1$ and $R_2$ represent polymethylene chains, and each of the residues $R_1$ and $R_2$ must contain at least so many carbon atoms that the sum of the carbon atoms in $R_1+R_2$ is at least 8, the number $m$ being selected so that the product of $m$ and the sum (C-atoms in $R_1$+C-atoms in $R_2+2$) is at least 50.

8. A composition as claimed in claim 1, wherein the dicarboxylic acid (b) has the formula

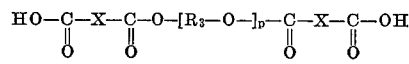

in which X represents a divalent aliphatic hydrocarbon residue and $R_3$ a polymethylene chain containing at least 6 carbon atoms, the number $p$ being selected so that the product of $p$ and the sum of the carbon atoms in $R_3$ is at least 50.

9. A composition as claimed in claim 1, wherein the dicarboxylic acid (b) has the formula

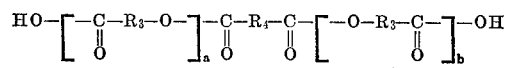

in which $R_3$ represents a polymethylene chain containing at least 5 carbon atoms, $R_4$ represents a divalent aliphatic hydrocarbon residue, the numbers $a$ and $b$ being selected so that the product of $(a+b)$ and the sum (carbon atoms in $R_3+1$) is at least 50.

10. A composition as claimed in claim 1, which further contains a tertiary amine as a basic curing accelerator.

(References on following page)

References Cited

UNITED STATES PATENTS

| | | | |
|---|---|---|---|
| 3,523,143 | 8/1970 | Kwong | 260—835 |
| 3,641,194 | 2/1972 | Schmid | 260—835 |
| 3,642,674 | 2/1972 | Schmid | 260—835 |
| 3,642,938 | 2/1972 | Schmid | 260—835 |
| 3,655,817 | 4/1972 | Lohse | 260—835 |
| 2,633,458 | 3/1953 | Shokal | 260—47 EC |
| 2,921,929 | 1/1960 | Phillips | 260—78.4 EP |
| 3,268,477 | 8/1966 | Mueller | 260—47 EC |
| 3,299,008 | 1/1967 | Mueller | 260—78.4 EP |
| 3,576,903 | 4/1971 | Groff | 260—824 |

JOSEPH L. SCHOFER, Primary Examiner

C. A. HENDERSON, Jr., Assistant Examiner

U.S. Cl. X.R.

117—122, 126; 161—184, DIG 4; 260—37 EP, 40 R, 75 EP, 78.4 EP